United States Patent [19]

Beavers

[11] Patent Number: 4,719,940
[45] Date of Patent: Jan. 19, 1988

[54] ADJUSTABLE TIED-DIAPHRAGM GAS PRESSURE REGULATOR

[75] Inventor: Michael E. Beavers, Gainesville, Tex.

[73] Assignee: Victor Equipment Company, Denton, Tex.

[21] Appl. No.: 904,346

[22] Filed: Sep. 5, 1986

Related U.S. Application Data

[63] Continuation-in-part of Ser. No. 897,417, Aug. 18, 1986, abandoned, which is a continuation-in-part of Ser. No. 878,569, Jun. 25, 1986, abandoned.

[51] Int. Cl.⁴ ............................................. F16K 31/38
[52] U.S. Cl. .......................... 137/505.39; 137/505.41; 137/505.42; 92/103 M; 251/368
[58] Field of Search ....................... 137/505.42, 505.41, 137/505.39; 92/100, 103 M, 98 R, 99; 219/21 ED, 21 EC

[56] References Cited

U.S. PATENT DOCUMENTS

| | | | |
|---|---|---|---|
| 473,069 | 4/1892 | Giessenbier | 137/505.41 |
| 2,103,576 | 12/1937 | Dockson | 137/505.42 X |
| 2,709,065 | 5/1955 | Pohndorf | 137/505.42 X |
| 2,747,607 | 5/1956 | Matasovic | 137/505.42 X |
| 2,819,728 | 1/1958 | Gage | 137/505.39 |
| 3,075,545 | 1/1963 | Eichelman | 137/505.42 X |
| 3,141,476 | 7/1964 | Davis | 251/86 X |
| 3,149,828 | 9/1964 | Schutmaat | 137/505.42 X |
| 3,552,431 | 1/1971 | Schmidlin | 137/505.42 X |
| 4,257,450 | 3/1981 | Ollivier | 137/505.42 |
| 4,369,347 | 1/1983 | Myhre | 219/121 ED |
| 4,376,885 | 3/1983 | Smirra | 219/121 EC |
| 4,471,802 | 9/1984 | Pryor | 137/505.42 X |

FOREIGN PATENT DOCUMENTS 557764  12/1943  United Kingdom ........... 137/505.39

Primary Examiner—Harold W. Weakley
Attorney, Agent, or Firm—Majestic, Gallagher, Parsons & Siebert

[57] ABSTRACT

A gas pressure reducing regulator has a tied-diaphragm so as to obtain relatively complete valve closure even with corrosive gases that tend to deposit particulate matter on the valve seat and otherwise inhibit valve closure. Misalignment of the diaphragm with respect to the valve is accommodated in several ways. First, a loose thread connection is provided at the point of attachment between the valve stem and the diaphragm. Second, the valve poppet has a spherical surface which mates with a frustoconical valve seat. Third, the diaphragm, which has a depending skirt, is free to move across the open end of the valve body prior to clamping the top to the valve body with the diaphragm sandwiched in between. Lastly, a valve spring guide is movable within a base so as to accommodate misalignment,

19 Claims, 9 Drawing Figures

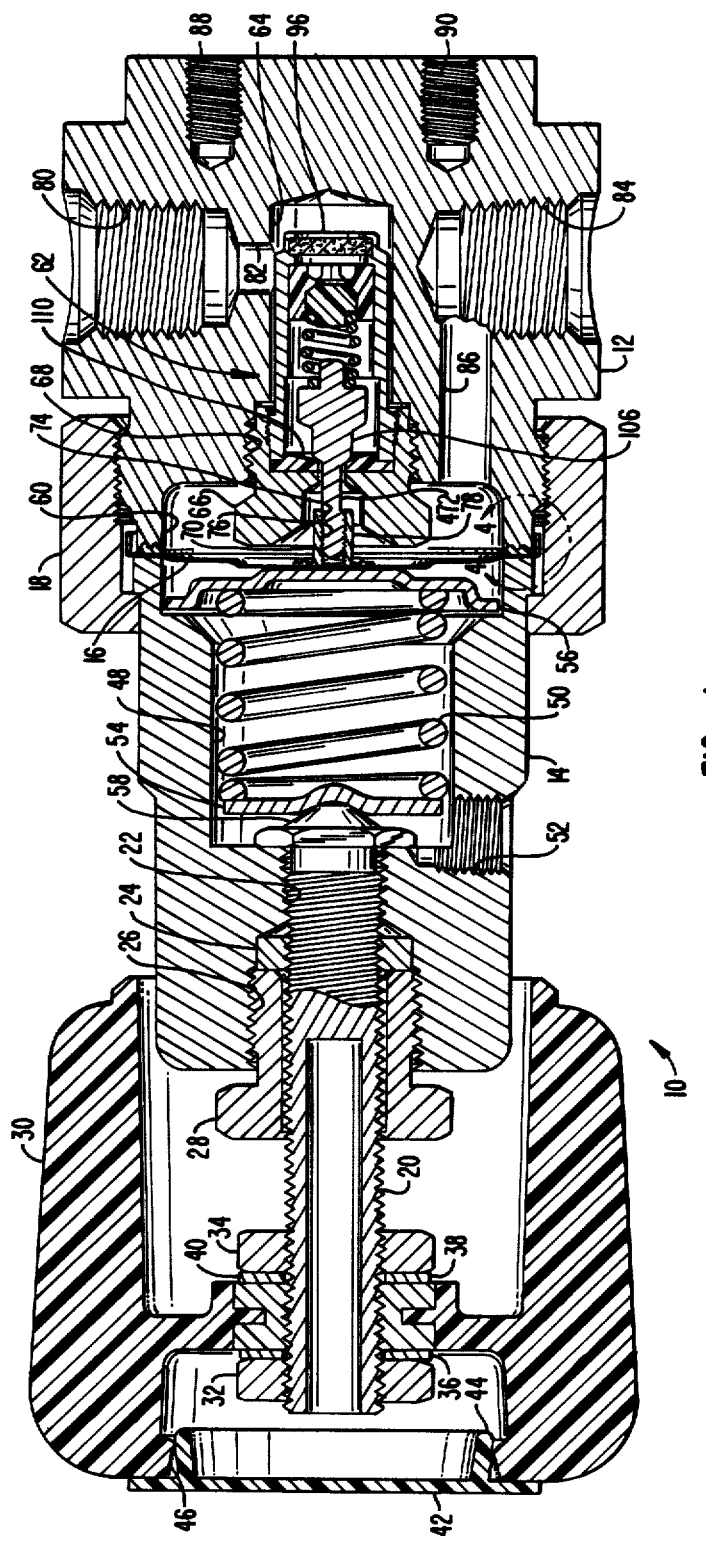
FIG._1.

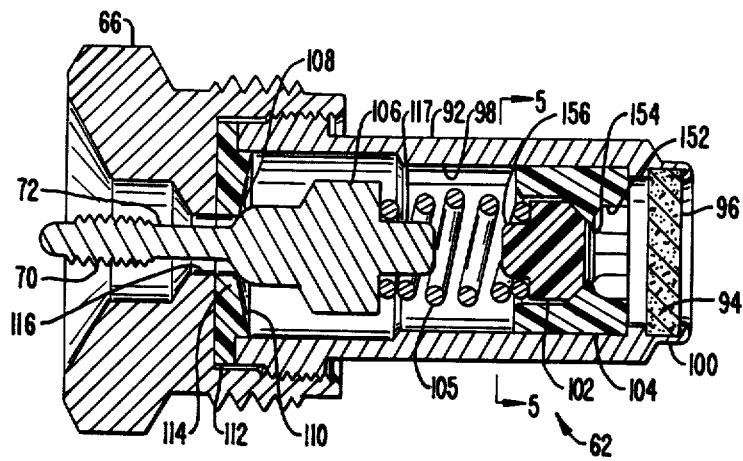
FIG._2.
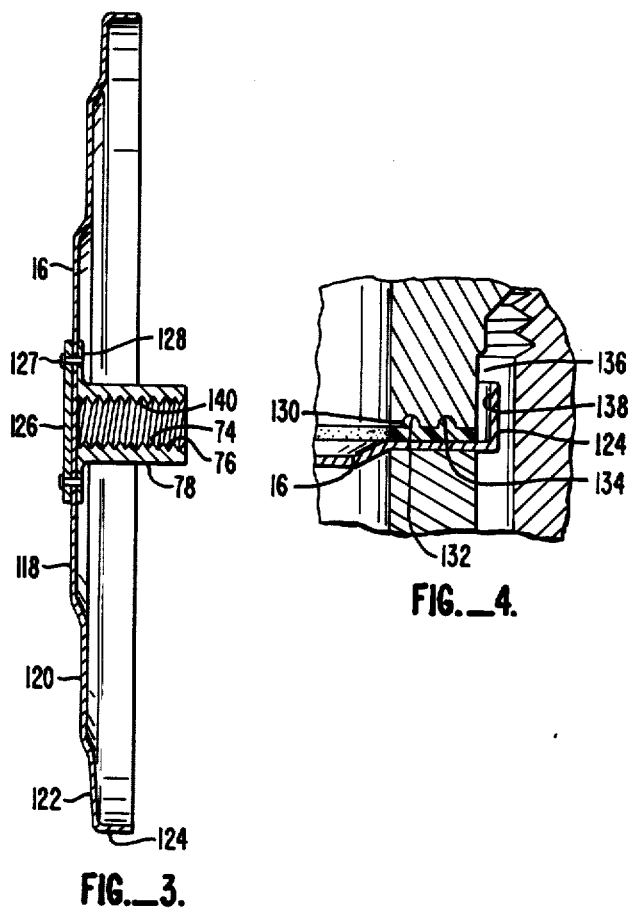
FIG._3.
FIG._4.

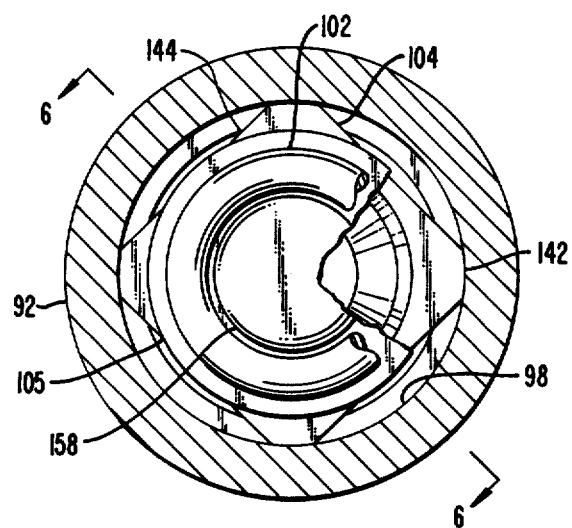
FIG._5.
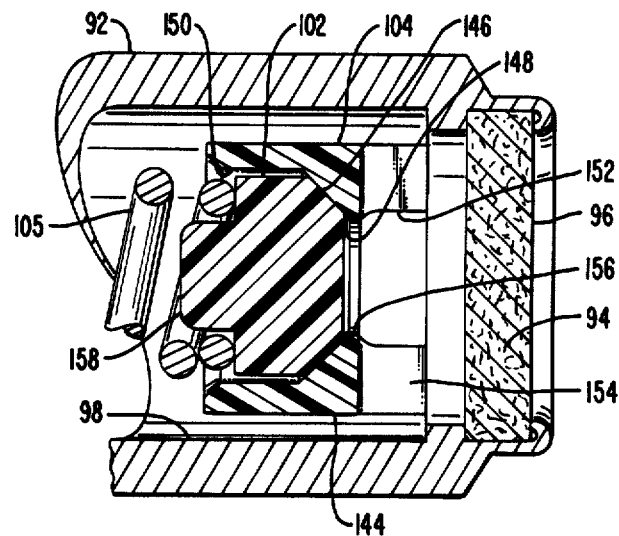
FIG._6.

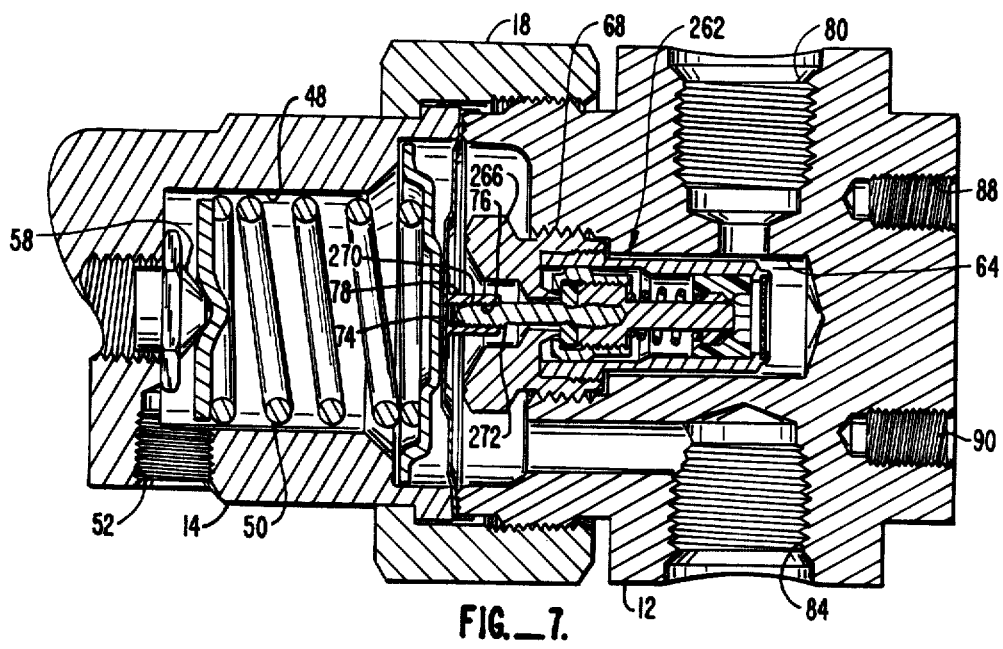
FIG._7.
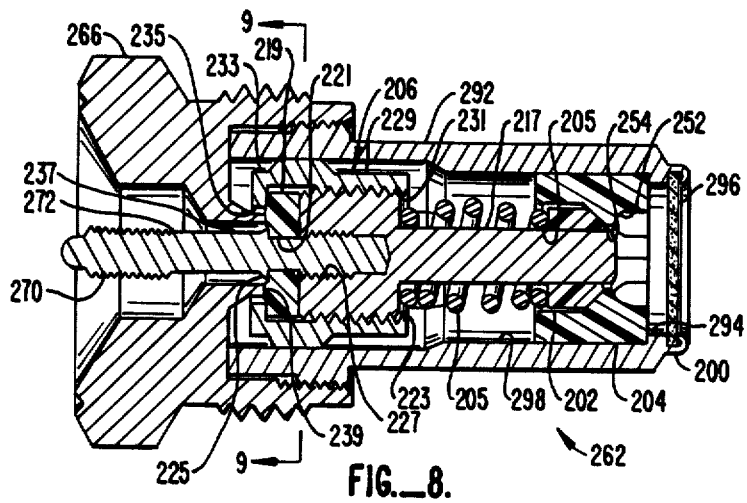
FIG._8.
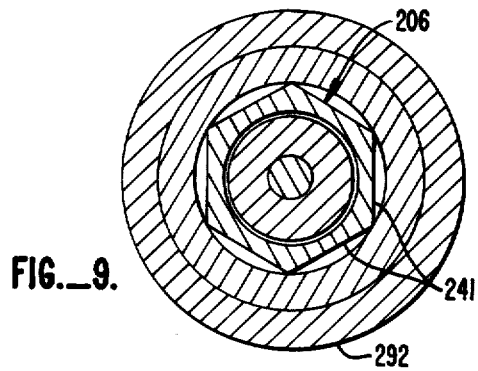
FIG._9.

ADJUSTABLE TIED-DIAPHRAGM GAS PRESSURE REGULATOR

This is a continuation-in-part of my application Ser. No. 897,417, filed Aug. 18, 1986, which is a continuation-in-part of my application Ser. No. 878,569, filed June 25, 1986, both now abandoned.

BACKGROUND OF THE INVENTION

1. Field of the Invention

This invention relates to tied-diaphragm gas pressure regulators. More particularly, it relates to gas pressure regulators having a diaphragm connected to the valve assembly so as to obtain relatively complete valve closure even when particles that may be produced by corrosive gases are present on the valve seat.

2. Description of the Prior Art

There are a number of gas pressure regulators in the prior art which have been developed for use with corrosive compressed gases such as hydrogen chloride and xylene. With corrosive gases, as opposed to non-corrosive gases, corrosion particles tend to deposit within the valve and especially on the valve seat. Some gases tend to generate corrosion particles which collect on the valve seat and interfere with proper shut-off of the valve poppet and thereby the regulation characteristics of the gas pressure regulator. By using a tied diaphragm, a relatively reliable complete valve closure at every shut-off is obtained, whether or not particles are present on the valve seat. This is accomplished by the valve diaphragm moving under pressure so as to pull the valve poppet against the seat.

These prior art tied-diaphragm gas pressure regulators have suffered from a number of problems. One problem is leakage through the diaphragm at the point of connection between the stem attaching the poppet to the diaphragm. In a very common construction, an opening must be made in the diaphragm. The stem is passed through the opening and suitable resilient sealing material such as plastic or rubber is used to attempt to eliminate leakage of gas through the diaphragm around the stem connection. However, these resilient materials are attacked and degraded by corrosive gases. When they are, corrosive gas can pass through the diaphragm into the regulator cap and thence into the ambient surrounds so as to cause a potential hazard. It is also desired to contain other gases such as toxic and high purity gases. A small leak of, for example, a toxic gas can result in a condition hazardous to humans. Beyond this, leakage of costly high purity gas results in unwanted economic loss. Leakage can also result in erratic behavior of the regulator.

Another problem common with prior art tied-diaphragm regulators is that they are sensitive to slight misalignments of the key parts. Slight misalignment of the diaphragm with respect to the valve core assembly causes problems in operation of the regulator. For example, the valve poppet may not close completely due to its being angularly displaced by a misaligned diaphragm to which it is connected by the stem.

One prior art attempt to solve the above-described problems is shown in U.S. Pat. No. 4,257,450. The subject patent describes a gas pressure regulator having a lost-motion connection to the diaphragm. Nevertheless, this construction requires a hole in the diaphragm, which may provide a path for unwanted leakage of corrosive and/or toxic gas. Metal-to-metal and resilient seals are provided in an attempt to cut off this unwanted leakage. As aforementioned, the resilient seals are subject to deterioration through exposure to the corrosive gases. They can even serve as fuel for unwanted combustion in the regulator and a destructive condition commonly known as regulator burnout. Even the metal-to-metal seals may potentially leak.

The subject patent also attempts to solve the misalignment problem by providing a complex mechanism including a number of parts. Both the sealing mechanism and the mechanism to accommodate misalignment are complex and therefore costly to produce.

SUMMARY AND OBJECTS OF THE INVENTION

Accordingly, it is an object of this invention to provide a gas pressure regulator having an improved tied-diaphragm assembly that eliminates the necessity of sealing elements.

It is a further object of this invention to provide an improved tied-diaphragm gas pressure regulator wherein the valve is tied to the diaphragm without necessity of making a hole in the diaphragm and thereby positively eliminating any leak path through the diaphragm for the escape of corrosive or other gas.

It is a further object of this invention to provide a gas pressure regulator having a means for self-adjusting for misalignment between the diaphragm and the valve assembly.

It is a still further object of this invention to provide a tied-diaphragm gas pressure regulator having an improved spherical seating surface on the valve poppet so that slight misalignments with the valve seat are accommodated.

It is a further object of this invention to provide a tied-diaphragm gas pressure regulator having a diaphragm of unitary one-piece construction so as to minimize the possibility of burn-through during unwanted combustion in the regulator.

It is a further object of this invention to provide a tied-diaphragm gas pressure regulator which eliminates combustible sealing elements and therefore materially reduces the amount of combustible material available for burning within the regulator.

The invention takes the form of a tied-diaphragm gas pressure reducing regulator for reducing high-pressure gas to low pressure for various applications. The gas pressure regulator of the instant invention is especially useful with corrosive gases. It is also usable with other gases such as toxic and high purity gases. Located between the upper or cap portion of the regulator and the lower or body portion is a flexible diaphragm. The diaphragm is operated upon by a spring plate which presses against the diaphragm on one side by means of a spring plate which is in control of the opening. Motion of the diaphragm is transmitted to a valve poppet of a valve core assembly by means of a valve stem which ties the diaphragm to the valve poppet. The free end of the valve stem is connected to a collar which is in turn attached to the diaphragm without the necessity of a hole being made through the diaphragm. Attachment is accomplished by means of electron beam welding in a vacuum.

In a first embodiment, the valve poppet has a spherical face in contact with a generally frustoconical valve seat of the valve assembly. In this manner, slight misalignment of the valve poppet with respect to the seat does not result in breaking of the seal. Misalignment between the valve assembly and the diaphragm is also accommodated by providing a loose thread fit between the valve stem and the receiving collar. Further accommodation of misalignment is achieved by means of an external groove on the valve body which accommodates lateral movement of a depending skirt of the diaphragm prior to clamping the cap to the body by means of a circumferential nut. Still further accommodation is accomplished by having a movable base for the valve biasing spring.

A second or alternate embodiment of the valve poppet is also provided which has an elastomeric flat seat in place of the spherical seat for enhanced performance at lower inlet pressures.

Further and other advantages and objects of the invention will become more readily apparent from a review of the following detailed description and accompanying drawings which illustrate a preferred embodiment of the invention.

BRIEF DESCRIPTION OF THE DRAWINGS

FIG. 1 is a side elevational cross-sectional view of the inventive gas regulator;

FIG. 2 is an enlarged cross-sectional view of the valve core assembly of the regulator of FIG. 1;

FIG. 3 is an enlarged cross-sectional view of the diaphragm of the regulator of FIG. 1;

FIG. 4 is an enlarged detail taken along the lines 4—4 in FIG. 1, illustrating a feature of the invention;

FIG. 5 is a cross-sectional view, partially cut away, taken along lines 5—5 in FIG. 2;

FIG. 6 is a cross-sectional view taken along lines 6—6 in FIG. 5;

FIG. 7 is a partial side elevational cross-sectional view similar to FIG. 1 including an alternate embodiment of the valve core assembly therein;

FIG. 8 is an enlarged cross-sectional view of the valve core assembly shown in FIG. 7; and FIG. 9 is a cross-sectional view taken along lines 9—9 in FIG. 8.

DESCRIPTION OF THE PREFERRED EMBODIMENT

In FIG. 1 there is shown generally at 10 a tied-diaphragm gas pressure regulator. The regulator consists of two main subassemblies, being a hollow body 12 and a spring housing or cap 14. The body 12 may be made of stainless steel. Other parts such as cap 14 are made of brass. Located between the cap and body is a thin, flexible diaphragm 16 of metal material such as stainless steel. Diaphragm 16 is of unitary, one-piece construction. By rotating a circumferential threaded nut 18, the body 12 and cap portions 14 are held together with the diaphragm 16 therebetween.

An adjusting screw 20 of brass material is threadedly received within an accommodating centrally disposed axial bore 22 within the end of cap 14. A seal 24 is contained within an enlarged threaded bore 26 on the end of cap 14. The seal is retained by means of a hollow threaded pressure nut 28 circumferentially around adjusting screw 20.

A knob 30 of plastic material such as polypropylene is threadably secured to an end of the adjusting screw 20 by means of a pair of nuts 32, 34. The nuts, in turn, are rotated against the pair of washers 36, 38, on opposite sides of an annular collar 40.

A circular plastic cap 42 having a dependent skirt 44 is snap fitted within an opening 46 in one end of the knob 30. The cap contains therein a generally cylindrical spring chamber 48 within which is contained a coil spring 50. A threaded vent bore 52 at one end of chamber 48 allows access to the ambient surrounds as well as an escape path for gas or other fluid should the diaphragm 16 be ruptured in some manner. A conduit (not shown) may be attached at the bore 52 so that any unwanted escaping gas may be directed to a safe location. Spring 50 is contained between a spring button or top plate 54 and a spring bottom plate 56, the latter of which is in operative contact with diaphragm 16. The frustoconically shaped pressure nut 58 of adjusting screw 20 contacts spring button 54.

As shown, a low pressure chamber 60 is contained within an open end of body 12 and is closed off by means of diaphragm 16. A valve core assembly generally shown at 62 is threadably secured within chamber 64 by means of a hollow threaded bushing 66 threadably secured within a bore 68 in body 12. As may be seen, a threaded end 70 of an elongated valve stem 72 is received within accommodating threads 74 within the bore 76 of the generally cylindrical collar 78.

A threaded high pressure inlet port 80 is adapted for conducting high pressure fluid from a fluid source (not shown) into high pressure chamber 64 by means of a fluid passage 82 in the body. Similarly, a threaded low pressure outlet port 84 conducts fluid from low pressure chamber 60 by means of passage 86 to an application of low pressure fluid (not shown). A pair of threaded bores 88, 90 in body 12 permit mounting of regulator 10 on a stable surface. With reference to FIGS. 1 and 2, valve core assembly 62 wherein all metal parts are of stainless steel consists of a generally cylindrical hollow body 92 having an opening 94 at its inlet end. Fitted within the opening is a metal mesh wire screen filter 96 serving as a filter to screen out impurities from the incoming fluid so that they do not pass into valve chamber 98. A lip 100 in the inlet end of body 92 is shown crimped over to retain wire screen filter 96. A thermoplastic base element 104 and guide 102 serve as a guide for biasing spring 105 which is located intermediate base element 102 and guide 104 as will be more fully described hereinafter.

A valve poppet 106 having a spherical sealing surface 108 seals against the generally frustoconical valve seat surface 110 of valve seat 112, which may be of plastic material. Projecting through concentric bores 114 and 116 in valve seat 112 and bushing 66, respectively, is the generally elongated valve stem 72. A post 117 on the end of the poppet opposite to the stem end has a diameter less than the diameter of the main body of the poppet 106. This post serves to retain spring 105 thereon.

As may be seen in FIG. 3, diaphragm 16 is a thin flexible member having stepped concentric surfaces 118, 120, 122 and a depending skirt 124. A disc-shaped member 126 is positioned on the side of diaphragm 16 opposite to the side on which collar 78 is positioned. Collar 78 and disc-shaped member 126 are fixed to diaphragm 16 by means of a circumferential weld 127 passing through disc-shaped member 126, diaphragm 16, and into annular rim 128 on collar 78. The weld is produced by an electron beam welding in a vacuum so that the material of disc-shaped member 126, diaphragm 16 and rim 128 are fused together.

Turning to FIG. 4, it is seen that an annular seal 130 of resilient material such as plastic is retained within a pair of concentric annular grooves 132, 134 surrounding the open end of body 12 so as to provide enhanced sealing. Alternatively, seal 130 may be eliminated and a metal-to-metal seal will result. This alternative may be optionally used where it is desired to minimize the presence of potentially flammable components and thereby enhance resistance to regulator burnout.

As may be seen, a circumferential groove 136 surrounds the open end and is spaced from the internal wall 138 of depending skirt 124 of diaphragm 16 so as to leave a space between the groove 136 and internal wall 138. In this manner, diaphragm 16 may be moved over the open end of the body 12 to accommodate any misalignment of valve assembly 62 prior to clamping of nut 18, as best seen in FIG. 1. Further accommodating this misalignment is the use of loose thread tolerances providing different pitch diameters for threads 70 on stem 72 and threads 140 within bore 76 of collar 78. For example, Class 2A and 2B, or even 1A and 1B Unified and American screw thread classes could be used. Still further accommodating such misalignment is the provision of a spherical surface 108 on poppet 106, sealing with frustoconical seat 110.

Yet another misalignment accommodation provision is found in the interaction between base element 104 and guide 102. As seen in FIGS. 5 and 6, base element 104 has a generally square shape with four rounded corners 142 for fitting within valve chamber 98. Four flat surfaces 144 are formed intermediate the four corners 142.

Guide element 102 has a generally frustoconical surface 146 which mates with an accommodating frustoconical seat 148 within base 104. A counterbore 150 in guide 104 communicates with a pair of right angle cross-passages 152, 154 by way of a smaller central bore 156.

The end of the guide element 102 opposite to its frustoconical surface 146 has a post 158 thereon of a diameter less than that of the main body of the base element. This post serves to retain spring 105 in position and prevent its unwanted removal from the base element. Movement of the guide element 102 within base element 104 helps to adjust for misalignment. If spring 105 is out of axial alignment with the base 104 and thereby body 92, guide element 102 will move slightly within seat 148 so as to accommodate such misalignment.

In operation, as best seen in FIG. 1, the regulator shown generally at 10 is connected to a high pressure fluid source such as a gas cylinder (not shown) by way of high pressure inlet port 80. High pressure gas flows through passage 82 and into high pressure chamber 64, and thence into valve core assembly 62 through filter 96 in the end thereof. As seen in FIG. 6, fluid flows through cross passages 152, 154 and around flats 144 on valve base 104 and thence into chamber 98.

By manually turning knob 30, adjusting screw 20 is rotated so as to force spring 50 against diaphragm 16 through spring plate 56. Movement of diaphragm 16 forces stem 72 to unseat poppet 106, which allows high pressure fluid to pass around valve seat 110 and thence into low pressure chamber 60. Fluid then flows through passage 86 and out through port 84 to an application (not shown). As the pressure increases in low pressure chamber 60, the pressure acting on diaphragm 16 counterbalances the force of spring 50 and moves it in a leftward direction, as seen in the drawing. This causes the diaphragm to pull poppet 106 closed by means of the stem 72. In this way, effects of varying inlet pressure are mitigated, and essentially constant pressure is maintained in low pressure chamber 60 regardless of inlet pressure.

Once the application (not shown) receiving fluid from low pressure outlet 84 begins to operate, pressure will decrease in low pressure chamber 60. This unbalances the force opposing spring 50, and stem 72 is then depressed by means of diaphragm plate 56 acting through diaphragm 16 so as to again depress poppet 106 away from valve seat 110. When pressures are again equalized, the poppet will again close.

Turning now to FIGS. 7 through 9, there is shown an alternate embodiment wherein structure similar to the first described embodiment bears like numbers. Alternate embodiment valve core assembly structure is numbered with a three digit number beginning with a "2."

As seen in FIG. 7, the valve core assembly shown generally at 262 is threadably secured within chamber 64 by means of a hollow threaded bushing 266. The bushing is threaded into bore 68 in body 12. A threaded end 270 of an elongated valve stem 272 is received within accommodating threads 74 within the bore 76 of generally cylindrical collar 78.

Turning now to FIGS. 8 and 9, the details of the valve core assembly 262 will now be described. The valve core assembly, wherein all metal parts are of stainless steel, has a generally cylindrical hollow body 292 having an opening 294 at its inlet end. Fitted within the opening is a metal mesh wire screen filter 296. A lip 200 is shown crimped over to retain filter 296. A thermoplastic damping element 202 is contained within thermoplastic base 204. The damping element, in turn, has a centrally disposed bore 205 therein for slidably receiving a shaft 217 projecting from the inlet end of valve poppet 206.

The valve poppet 206 includes a circular valve seat 219 having a centrally disposed hole 221 therethrough. Valve seat 219 is retained on the generally cylindrical body 223 of poppet 206 by means of an annular rim 225 around valve stem 272 intermediate its ends. As seen, the valve stem is threadedly secured within a bore 227 in head 223. Also assisting in retaining valve seat 219 is a hex-shaped generally cylindrical cap 229 having an open end 231 for receiving head 223. It also has a closed end 233 having a centrally disposed hole 235 therein.

By threadedly advancing both cap 229 and valve stem 272, the valve seat may be made to produce an annular bulge 237 having a curved surface thereon which is of a diameter to correspond with an annular lip 239 of bushing 266. The valve poppet 206 is biased by means of a coil spring 205 which extends between damping element 202 and head 223.

The valve seat is preferably of an elastomeric material that resists corrosion and erosion by the gas being regulated. One such material is the Kalrez elastomeric material produced by Dupont Company.

The operation of the subject valve core assembly is similar to that of the first described embodiment in that high pressure fluid is admitted therein through inlet opening 294. Fluid then passes through cross passages 252, 254 and around flats (not shown) on the exterior of guide 204. These flats may be like those numbered 104 in the first embodiment. Fluid then flows through valve chamber 298 and around valve poppet 206.

As best seen in FIG. 9, cap 229 is hex shaped so as to provide flats 241 allowing for flow of fluid through the passages formed by the flats and the interior wall of valve chamber 298.

While the invention has been described in conjunction with a preferred embodiment thereof, it will be understood that the description is intended to illustrate and not limit the scope of the invention, which is to be defined by the scope of the appended claims.

I claim:

1. A pressure regulator for regulating the flow of fluid from a high pressure source to a low pressure application comprising:
   a. a body,
   b. a high pressure valve chamber in said body,
   c. an inlet opening in said body for communicating said high pressure valve chamber with a source of high pressure fluid,
   d. a low pressure chamber in said body having an open end,
   e. a flexible diaphragm closing off said open end, said diaphragm having a side away from said low pressure chamber being exposed to the ambient surrounds,
   f. a cap on said body defining an ambient air chamber therein, said diaphragm being positioned between said cap and said body so that said air chamber is adjacent to said away from said low pressure chamber,
   g. spring means in said cap for adjusting the position of said diaphragm.
   h. valve means in said body intermediate said high and low pressure chambers for controlling flow of fluid from said high to said low pressure chambers,
   i. attachment means for operatively attaching said valve means to said diaphragm, wherein said attachment means is affixed to the side opposite to said one side of said diaphragm and wherein said diaphragm is free of any openings and of unitary, one-piece construction, and
   j. said diaphragm being a generally flat, disc-shaped member having an annular skirt depending therefrom, said body adjacent said opening defining a cylindrical shape having a diameter substantially less than that of the internal diameter defined within said skirt whereby said diaphragm may move across said open end without interfering with said cylindrical shape whereby misalignment of said valve means with respect to said diaphragm may be automatically adjusted for.

2. The invention of claim 1 wherein said valve means comprises a valve seat, a valve poppet having a sealing means thereon for sealing against said valve seat when in contacting relation therewith, said valve poppet having a valve stem, and wherein said attachment means operatively couples said diaphragm with said valve stem and thereby with said valve poppet so that reciprocal movement of said diaphragm is transmitted to said valve poppet.

3. The invention of claim 2 wherein said valve stem is a generally elongated member defining a free end and wherein said attachment means is a generally cylindrical collar having an opening therein, said free end of said stem being fitted within said opening, and means loosely attaching said valve stem to said collar within said opening whereby misalignment of said valve means with respect to said diaphragm may be automatically adjusted for.

4. The invention of claim 3 whereby the means attaching said stem to said collar comprise mating threads on said valve stem and within said opening.

5. The invention of claim 4 wherein said thread on said valve stem and within said opening are of different pitch so as to produce the loose fitting connection between said valve stem and said collar.

6. The invention of claim 2 further including an annular groove around said body adjacent said depending skirt of said diaphragm so as to provide space to further accommodate the movement of said diaphragm.

7. The invention of claim 3 wherein said attachment means further includes a weld attaching said collar to said diaphragm.

8. The invention of claim 7 wherein said weld is an electron beam weld.

9. The invention of claim 3 wherein said attachment means further includes a flat plate member on said diaphragm positioned on said surface of said diaphragm positioned away from said low pressure chamber and a weld operatively connecting said collar with said flat plate member through said diaphragm.

10. The invention of claim 9 wherein said weld penetrates through said flat plate member and said diaphragm and into said collar.

11. The invention of claim 2 wherein said sealing means on said valve poppet comprises a generally spherical valve surface and wherein the shape of the mating valve seat is generally frustoconical whereby misalignment of said valve means with respect to said diaphragm may be automatically adjusted for.

12. The invention of claim 2 wherein said valve means further comprises a valve spring seat means and a valve spring extending between said poppet and said valve spring seat means so as to force said poppet into sealing engagement with said valve seat, and wherein said valve spring seat means is movable so as to accommodate misalignment of said valve spring.

13. The invention of claim 12 wherein said valve spring seat means comprises a generally frustoconical valve spring guide in contacting relation with a valve base having a mating frustoconical seat therein so that said valve spring guide is movable within said frustoconical seat.

14. The invention of claim 2 wherein said sealing means on said valve poppet comprises an annular lip and wherein said mating valve seat comprises an annular curved surface on valve seat.

15. The invention of claim 14 further including means on said valve poppet for causing said valve seat to form said curved surface at the line of contact with said annular lip.

16. The invention of claim 15 wherein said means on said valve poppet comprises an annular rim on said valve stem adapted for compressing said valve seat so that it bulges to form said curved surface.

17. The invention of claim 15 wherein said valve seat is generally circular and wherein said means on said valve poppet comprises a cap adapted for compressing said valve seat adjacent its periphery so that it bulges to form said curved surface.

18. The invention of claim 13 further including a shaft extending from said poppet within said valve spring, a centrally disposed hole within said valve spring damper, and wherein said shaft is dimensioned so as to be in sliding engagement within said hole in said damper so that axial movement of said poppet is guided and damped thereby.

19. The invention of claim 14 wherein said valve seat is made from an elastomeric material.

* * * * *

UNITED STATES PATENT AND TRADEMARK OFFICE
CERTIFICATE OF CORRECTION

PATENT NO. : 4,719,940
DATED : Jan. 19, 1988
INVENTOR(S) : Michael E. Beavers

It is certified that error appears in the above-identified patent and that said Letters Patent is hereby corrected as shown below:

Col. 7, line 21:  insert --side-- between "said" and "away".

Signed and Sealed this

Seventh Day of June, 1988

Attest:

DONALD J. QUIGG

*Attesting Officer*    *Commissioner of Patents and Trademarks*